(12) United States Patent
Yamauchi et al.

(10) Patent No.: US 8,029,146 B2
(45) Date of Patent: Oct. 4, 2011

(54) LIGHT SOURCE DEVICE AND PROJECTOR

(75) Inventors: Taisuke Yamauchi, Suwa (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 411 days.

(21) Appl. No.: 12/053,890

(22) Filed: Mar. 24, 2008

(65) Prior Publication Data

US 2008/0247022 A1    Oct. 9, 2008

(30) Foreign Application Priority Data

Apr. 3, 2007   (JP) .................................. 2007-097195

(51) Int. Cl.
*G03B 21/28* (2006.01)
(52) U.S. Cl. ......................................... 353/99; 353/98
(58) Field of Classification Search .............. 359/196.1, 359/707, 212.1; 353/98, 94, 99
See application file for complete search history.

(56) References Cited

U.S. PATENT DOCUMENTS

| 5,584,552 | A | * | 12/1996 | Nam-Su et al. ................. 353/70 |
| 6,594,090 | B2 |  | 7/2003 | Kruschwitz et al. |
| 2005/0057727 | A1 | * | 3/2005 | Troyer ............................ 353/31 |
| 2008/0165401 | A1 |  | 7/2008 | Kasazumi |
| 2008/0198334 | A1 |  | 8/2008 | Kasazumi et al. |

FOREIGN PATENT DOCUMENTS

| JP | A-11-337888 | 12/1999 |
| JP | A-2003-098476 | 4/2003 |
| JP | A 2007-33576 | 2/2007 |
| WO | WO 2006/090681 A1 | 8/2006 |
| WO | WO 2006090681 A1 * | 8/2006 |
| WO | WO 2006/098281 A1 | 9/2006 |
| WO | WO 2006098281 A1 * | 9/2006 |

OTHER PUBLICATIONS

Translation of WO 2006090681 A1.*
Translation of WO 2006098281 A1.*

* cited by examiner

*Primary Examiner* — Que T Le
*Assistant Examiner* — Jerry Brooks
(74) *Attorney, Agent, or Firm* — Oliff & Berridge, PLC (57) ABSTRACT

A light source device which produces illumination light for illuminating a target illumination area on a predetermined light receiving surface includes: a light source which emits light; a superimposing illumination element which superimposes the light emitted from the light source and applies the light to the target illumination area; an optical path converting unit disposed on an optical path between the light source and the superimposing illumination element to convert the optical path of the light emitted from the light source and supply the light having the converted optical path to the superimposing illumination element; and a shift unit which shifts the optical path converting unit.

7 Claims, 9 Drawing Sheets

LIGHT SOURCE DEVICE AND PROJECTOR

BACKGROUND

1. Technical Field

The present invention relates to a light source device and a projector.

2. Related Art

Currently, a technology of incorporating a laser beam source in a projection type image display apparatus (projector) has been proposed, which display apparatus projects color light containing image information produced by a spatial light modulating device such as a liquid crystal device on a screen by using a projection system (for example, see JP-A-2007-33576).

A lighting device disclosed in JP-A-2007-33576 includes a light source device for emitting light and a diffraction optical element for equalizing illuminance distribution of entering light. The lighting device applies rectangular conversion to light emitted from the light source device by using the diffraction optical element and illuminates a predetermined illumination area. The projection type image display apparatus having this lighting device includes a light valve disposed opposed to the diffraction optical element, and illuminates the light valve by diffraction light produced by the diffraction optical element.

However, the related-art technology described above has the following problems.

When an illumination image obtained after rectangular conversion by the diffraction optical element is enlarged and projected via a projection lens, speckle patterns easily recognizable by human eyes are produced on the image. These speckles are generated by manufacture errors or design errors of the diffraction optical element. Since the image is expanded to about one hundred times larger image through the enlarged illumination by the projection lens at the time of display on the screen, the speckles are easily observed on the image.

A possible method for solving this problem is to provide a rotation type diffusing plate which rotates laser beam emitted from the light source, or a swing type diffusing plate which swings the laser beam in the vertical, horizontal, or other directions on the light source device. However, the rotation type diffusing plate requires a rotation driving system such as a motor, which increases the size of the device. Moreover, the rotation type and swing type diffusing plates which diffuse light emitted from the diffraction optical element have positional limitation in positioning these plates and decreases light utilization efficiency. Thus, according to the structure having the diffusing plate, reduction of the device size and space saving cannot be achieved.

SUMMARY

It is an advantage of some aspects of the invention to provide a light source device and a projector capable of reducing device size and achieving space saving without lowering utilization efficiency of light emitted from a diffraction optical element and with reduced speckle patterns on the light.

A light source device according to a first aspect of the invention which produces illumination light for illuminating a target illumination area on a predetermined light receiving surface includes: a light source which emits light; a superimposing illumination element which superimposes the light emitted from the light source and applies the light to the target illumination area; an optical path converting unit disposed on an optical path between the light source and the superimposing illumination element to convert the optical path of the light emitted from the light source and supply the light having the converted optical path to the superimposing illumination element; and a shift unit which shifts the optical path converting unit.

According to the light source device of this aspect of the invention, the light emitted from the light source is supplied to the superimposing illumination element after its optical path is converted by the optical path converting unit. The light having entered the superimposing illumination element is superimposed and applied to the target illumination area of the light receiving surface.

In this step, the entering position of the light entering the superimposing illumination element is varied with time in accordance with the shift of the optical path converting unit achieved by the shift unit. In this case, speckle patterns on the light released from the superimposing illumination element are varied with time, and integrated with time due to the after image effect on human eyes. As a result, reduction of speckle patterns on the light can be achieved. Thus, the light source device according to this aspect of the invention varies the speckle patterns on the light released from the superimposing illumination element with time not by using a diffusing plate as in the related art, but by shifting the optical path converting unit. Accordingly, the target illumination area can be illuminated by light having reduced speckle patterns without decrease in the light utilization efficiency. Moreover, the degree of freedom in positioning the light source and the superimposing illumination element increases when compared with the structure using the diffusing plate which has positional limitation, since the optical path converting unit disposed on the optical path between the light source and the superimposing illumination element converts the optical path. Accordingly, space saving is achieved, and thus the size of the entire device is reduced.

The target illumination area is illuminated by the light superimposed by the superimposing illumination element. Thus, the target illumination area can be uniformly illuminated even when the entering position of the light entering the superimposing illumination element is shifted by the movement of the optical path converting unit.

It is preferable that the optical path converting unit is a reflection member which reflects the light emitted from the light source toward the superimposing illumination element.

According to this structure, the light emitted from the light source is reflected by the reflection member as the optical converting unit and enters the superimposing illumination element. When the reflection member has high reflectance, no loss of light amount is produced during reflection of the light emitted from the light source toward the superimposing illumination element. Thus, illumination light having high brightness can be applied to the target illumination area.

It is preferable that the optical path converting unit is a prism which refracts the light emitted from the light source toward the superimposing illumination element.

According to this structure, the light emitted from the light source is reflected by the prism as the optical converting unit and enters the superimposing illumination element. When the prism has desired entrance end surface and exit end surface corresponding to the positions of the light source and the superimposing illumination element, the light emitted from the light source is appropriately supplied to the superimposing illumination element. When the prism has high transmittance, no loss of light amount is produced during supply of the light emitted from the light source to the superimposing illumination element. Thus, illumination light having high brightness can be applied to the target illumination area with increased freedom in positioning the light source and the superimposing illumination element.

It is preferable that the shift unit shifts the optical path converting unit such that the center axis of light released from the optical path converting unit is moved by parallel displacement.

According to this structure, the optical path converting unit is moved such that the center axis of the light released from the optical path converting unit is shifted by parallel displacement. Thus, the incident angle of the light entering the superimposing illumination element is kept constant. Accordingly, the light released from the superimposing illumination element can be securely applied to the target illumination area.

It is preferable that the shift unit reciprocates the optical path converting unit.

According to this structure, the shift unit reciprocates the optical path converting unit in the direction where the center axis of the light released from the optical path converting unit shifts by parallel displacement. Thus, the shift control of the optical path converting unit is facilitated. Moreover, the size of the entire device can be reduced when the shift unit is constituted by a miniaturized solenoid.

It is preferable that the shift unit continuously moves the optical path converting unit.

According to the screen in this structure, the optical path converting unit has no dead point (point at which movement stops for an instant) due to its continuous movement achieved by the shift unit. Thus, no instant for generating speckle patterns on the light emitted from the superimposing illumination element exists. Thus, equalized illumination light having more securely reduced speckle patterns can be applied to the light receiving surface without decrease in light utilization efficiency.

It is preferable that the plural optical path converting units are provided on the same optical path of the light emitted from the light source. In this case, it is preferable that the shift unit always shifts at least one of the optical path converting units.

When one optical converting unit reciprocates, dead point (point at which optical converting unit stops) exists. Since the light source device having the above structure includes the plural optical converting units, always at least one of the optical converting units can shift. That is, one of the plural optical path converting units always shifts without producing a break in the continuation of movement. In this case, generation of dead point is prevented, and thus speckle patterns on the light released from the superimposing illumination element can be more securely reduced.

It is preferable that the plural light sources and optical converting units are provided, and that the shift unit always shifts at least one of the optical path converting units. In this case, it is preferable that each of the optical converting units converts the optical path of light emitted from at least one of the plural light sources and supplies the light having the converted optical path to the superimposing illumination element.

According to this structure, the optical path of light emitted from at least one of the plural light sources is converted by the plural optical converting units, and the light having the converted optical path is supplied to the superimposing illumination element. Since at least one of the plural optical path converting units is shifted all the times, random (irregular) shift of the entering position of the light entering the superimposing illumination element can be achieved on the whole by separately controlling each of the plural optical converting units, for example. Thus, generation of speckle patterns on the light released from the superimposing illumination element can be more securely prevented.

A projector according to a second aspect of the invention includes: the light source described above; a light modulation device which modulates the light emitted from the light source according to an image signal; and a projection device which projects an image formed by the light modulation device.

According to the projector of the second aspect of the invention, the light emitted from the light source device enters the light modulation device. Then, an image formed by the light modulation device is projected by the projection device. The light emitted from the light source device in this step has reduced speckle patterns without decrease in the light utilization efficiency. Thus, images having no unevenness of brightness can be projected on the projection receiving surface.

BRIEF DESCRIPTION OF THE DRAWINGS

The invention will be described with reference to the accompanying drawings, wherein like reference numbers are given to like elements.

DESCRIPTION OF EXEMPLARY EMBODIMENTS

A light source device and a projector embodying the invention are hereinafter described with reference to the drawings. Reductions of the respective components are appropriately varied in the respective figures so that each component can obtain recognizable size.

In the following description, the positional relations of the respective components are explained referring to an XYZ orthogonal coordinate system established herein. The emission directions of laser beams emitted from laser beam sources 2 correspond to the X axis direction, the center axes of the beams entering a hologram element 4 in the emission direction correspond to the Y axis direction, and the direction perpendicular to the X axis direction and Y axis direction corresponds to the Z axis direction.

First Embodiment

A light source device according to a first embodiment of the invention is now described with reference to FIGS. 1 through 3.

Figure 1:
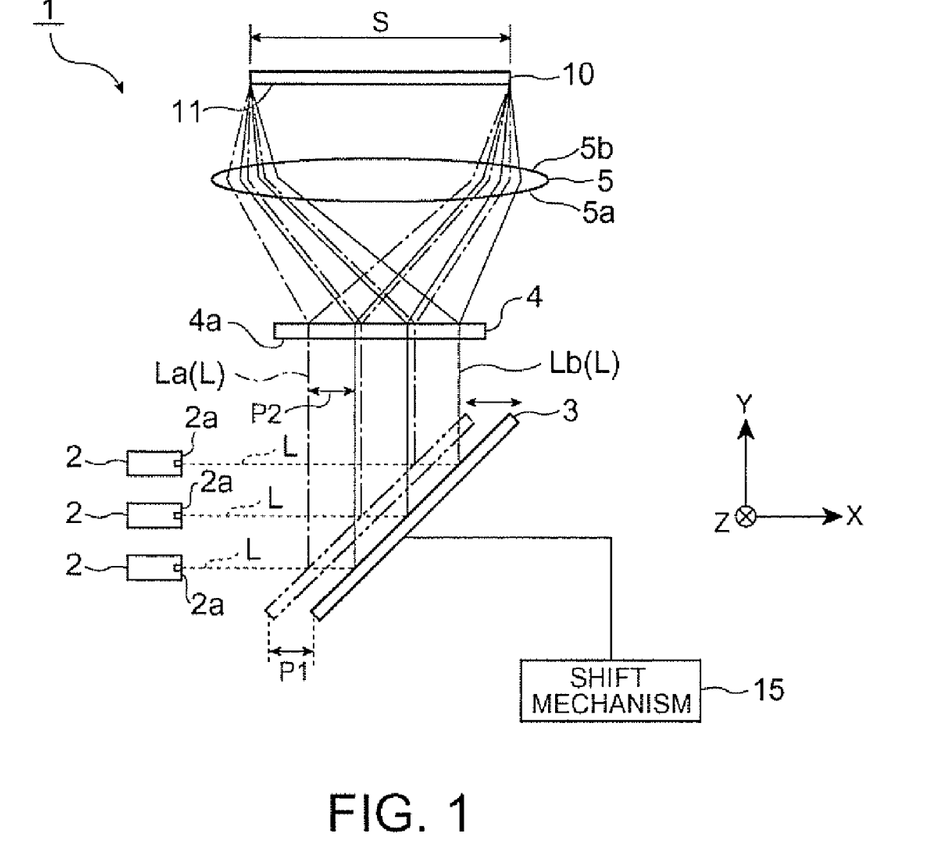
FIG. 1 is a plan view of a light source device according to a first embodiment of the invention.

FIG. 1 illustrates a general structure of the light source device according to the first embodiment. In FIG. 1, a light source device 1 illuminates a light receiving surface 11 of an illumination target 10, and includes the laser beam sources 2, a reflection plate 3, a hologram element 4, and a refractive lens 5. In this embodiment, the light receiving surface 11 is disposed substantially in parallel with the ZX plane. In the following description, it is assumed that the light source device 1 supplies illumination light to a target illumination area S of the light receiving surface 11 disposed substantially in parallel with the ZX plane. The target illumination area S is the entire surface of the light receiving surface 11 of the illumination target 10.

As illustrated in FIG. 1, the light source device 1 has the three laser beam sources (light source devices) 2 each of which emits laser beam L. In this embodiment, each exit end surface 2a of the laser beam sources 2 is disposed in the +X axis direction. Each of the laser beam sources 2 emits the laser beam L traveling substantially in parallel with the X axis direction toward the reflection plate 3 (+X direction). In this embodiment, the plural laser beam sources 2 are disposed side by side in the direction toward the hologram element 4 (Y axis direction), and the laser beam L is emitted from each of the laser beams sources 2 toward the reflection plate 3.

The reflection plate 3 (optical path converting unit) provided on the optical path between the laser beam sources 2 and the hologram element 4 reflects the laser beams L released from the laser beam sources 2 in the X axis direction such that each optical path direction of the laser beams L changes to the Y axis direction. More specifically, the reflection plate 3 is disposed such that the laser beams L emitted from the plural laser beam sources 2 enter the reflection plate 3 at 45 degrees. Thus, the laser beams L reflected by the reflection plate 3 travels in the Y direction toward the hologram element 4.

The reflection plate 3 has a shift mechanism (shift unit) 15 for shifting the reflection plate 3. The shift mechanism 15 is constituted by a miniaturized solenoid, for example.

The shift mechanism 15 shifts the reflection plate 3 for a shift distance P1 in the X axis direction such that the reflection plate 3 can reciprocate by parallel displacement between a condition indicated by an alternate long and short dash line shown in FIG. 1 and a condition indicated by a solid line in FIG. 1. Thus, each center axis of the laser beams L reflected by the reflection plate 3 shifts by parallel displacement from a laser beam La (alternate long and short dash line) to a laser beam Lb (solid line).

The shift speed of the reflection plate 3 shifted by the shift mechanism 15 is now described.

When different speckle patterns are observed sixty times a second by human eyes, these speckle patterns come to overlap with one another at a time due to after image effect of the eyes. Thus, the speckle patterns are not visually recognized in this condition.

When the hologram element 4 in this embodiment reproduces a definitely different reproduction pattern for every shift of 0.05 mm, speckle patterns emitted from the hologram element 4 can be removed by shifting the reflection plate 3 at the speed of 0.05×60=3 mm per second.

When the hologram element 4 reproduces a definitely different reproduction pattern for every shift of 0.02 mm, speckle patterns can be removed by moving the reflection plate 3 at the shift speed of 1.2 mm/sec based on similar calculation.

The hologram element (superimposing illumination element) 4 is disposed such that its entrance end surface 4a is positioned substantially in parallel with the ZX plane. Thus, the laser beams L reflected by the reflection plate 3 enter the entrance end surface 4a of the hologram element 4 in the vertical direction.

Then, the hologram element 4 diffracts the laser beams L entering through the entrance end surface 4a to produce diffracted lights. That is, the hologram element 4 superimposes the entering laser beams L to illuminate the target illumination area S of the illumination target 10.

The hologram element 4 is made of quartz (glass), transparent synthetic resin, or other material capable of transmitting laser beam. The hologram element 4 in this embodiment is constituted by a computer generated hologram (CGH).

The hologram element 4 has illumination area setting function, illumination equalizing function, and enlarging illumination function. The hologram element 4 having the illumination area setting function diffracts entering light to produce illumination light for illuminating the predetermined target illumination area S. The hologram element 4 having the illumination equalizing function equalizes illuminance of at least a part of the predetermined area. The hologram element 4 having the enlarging illumination function illuminates the target illumination area S which is larger than the emission area through which light is emitted from the exit end surface of the hologram element 4.

Figure 2A:
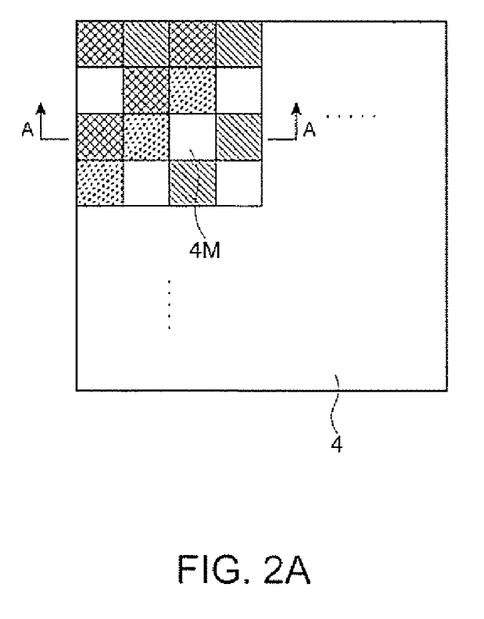
FIGS. 2A and 2B illustrate a superimposing illumination element included in the light source device shown in FIG. 1.
Figure 2B:
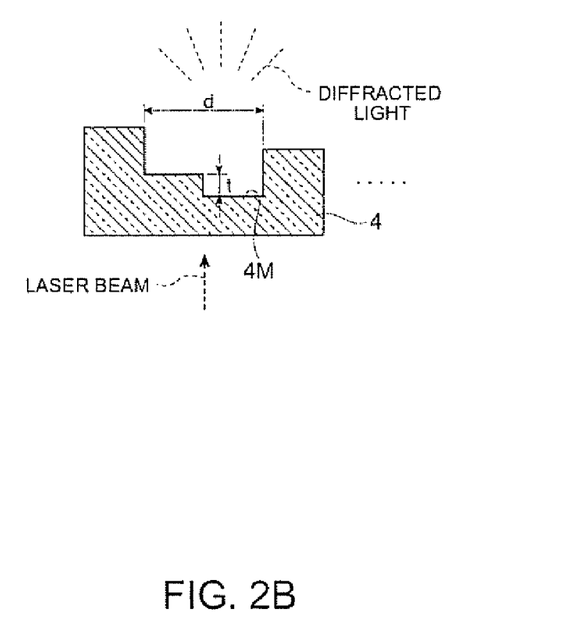

FIGS. 2A and 2B schematically illustrate an example of the hologram element. FIG. 2A is a plan view, and FIG. 2B is a cross-sectional view taken along a line A-A in FIG. 2A as viewed in the direction of arrows. As illustrated in FIGS. 2A and 2B, a plurality of rectangular concaves (concave and convex structure) 4M are provided on the surface of the hologram element 4. The concaves 4M have depths different from one another.

The hologram element 4 acquires the predetermined functions (illumination area setting function, diffusion light producing function, and enlarging illumination function) by appropriately controlling the surface condition of the hologram element 4 including a pitch d of the concaves 4M and a depth (convex height) t of the concaves 4M. For optimizing the surface condition, predetermined calculation (simulation) such as repetitive Fourier calculation is used as a method for optimizing design.

The hologram element 4 is not limited to the component having the rectangular concaves 4M, but may be a component which has a surface as a combination of flat surfaces facing in different directions. For example, the hologram element 4 may be a so-called blaze type component which has triangular concaves containing slopes. Alternatively, the hologram element 4 may be a component which has both an area containing the rectangular concaves 4M shown in FIGS. 2A and 2B and an area containing triangular concaves. The hologram element 4 having desired functions can be produced by optimizing the surface condition.

As illustrated in FIG. 1, the refractive lens 5 has an entrance end surface 5a through which laser beam is received, and an exit end surface 5b through which the laser beam having entered from the entrance end surface 5a is released. The refractive lens 5 controls the emission angle of the laser beam entering through the entrance end surface 5a, and releases the laser beam through the exit end surface 5b. In this embodiment, the refractive lens 5 is disposed between the hologram element 4 and the light receiving surface 11, and laser beam coming from the hologram element 4 enters the entrance end surface 5a of the refractive lens 5. According to this embodiment, the refractive lens 5 contains a spherical lens, or axial symmetric lens which is rotationally symmetric with respect to the optical axis of such as aspherical lens, for example. Alternatively, the refractive lens 5 may contain Fresnel lens or the like. The refractive lens 5 controls emission angle of laser beam released from the exit end surface 5b, and also incident angle of laser beam (illumination light) entering the light receiving surface 11.

A method for illuminating the target illumination area S of the light receiving surface 11 of the illumination target 10 by using the light source device 1 having the structure according to this embodiment is now described.

The laser beams L emitted from the laser beam sources 2 enter the reflection plate 3, and travels toward the hologram element 4 after reflected by the reflection plate 3. The laser beams L having entered the hologram element 4 are diffracted and superimposed on the target illumination area S of the light receiving surface 11 of the illumination target 10 to illuminate the target illumination area S.

In this step, the reflection plate 3 reciprocates in parallel in the X axis direction by the function of the shift mechanism 15. Thus, the laser beams L reflected by the reflection plate 3 change their entering positions on the entrance end surface 4a of the hologram element 4 by the shift of the reflection surface 3. Since the entering positions of the laser beams L on the hologram element 4 continuously change, the laser beams released from the hologram element 4 obtain different reproduction patterns in accordance with the positional changes. By superimposing these plural reproduction patterns, speckle patterns on the laser beams released from the hologram element 4 can be removed.

The light source device 1 according to this embodiment does not use a diffusing plate which possibly causes lowering of light utilization efficiency as usual, but shifts the reflection plate 3 to reduce speckle patterns on the light released from the hologram element 4. Thus, the light source device 1 can illuminate the target illumination area S of the light receiving surface 11 by laser beam having reduced speckles without lowering light utilization efficiency. While the structure using the diffusion plate has positional limitation in positioning the diffusion plate, the structure in this embodiment which includes the reflection plate 3 only required to be disposed on the optical path between the laser beam sources 2 and the hologram element 4 has higher degree of positional freedom.

Accordingly, the light source device 1 in this embodiment can reduce speckle patterns without lowering utilization efficiency of light released from the hologram element 4, and can achieve device size reduction and space saving.

By the shift of the reflection plate 3, the speckle patterns of the laser beams applied to the target illumination area S vary with time. In this case, the speckle patterns are integrally averaged within the period of after image effect on human eyes. Accordingly, scintillation (scintillating phenomenon of light) caused by speckle patterns is not easily recognized by human eyes.

Since the hologram element 4 superimposes the entering laser beams L, the laser beams having reached any regions within the pattern area of the hologram element 4 can illuminate the same target illumination area S. Thus, the target illumination area S of the light receiving surface 11 can be illuminated by illumination light having uniform illuminance distribution by the shift of the reflection plate 3 without lowering light utilization efficiency even when the entrance positions of the laser beams L released from the entrance end surface 4a of the hologram element 4 are shifted.

When the reflection plate 3 has high reflectance, the reflection plate 3 can reflect the laser beams L emitted from the laser beam sources 2 toward the hologram element 4 without loss of light amount. Thus, illumination light having high brightness can be applied to the target illumination area S.

Furthermore, the shift mechanism 15 reciprocates the reflection plate 3 such that the center axes of the laser beams L released from the reflection plate 3 can shift by parallel displacement. Thus, the shift of the reflection plate 3 is easily controlled, and the incident angle of the laser beams L entering the hologram element 4 can be maintained at a fixed angle. When a miniaturized solenoid is used as the shift mechanism 15, for example, facilitation of control, entire device size reduction, and secure illumination of the target illumination area S can be achieved.

It is preferable that the shift distance P1 of the reflection plate 3 is set at a longest possible distance. When the shift distance P1 is long, a shift distance P2 between the center axis of the laser beam La and the center axis of the laser beam Lb becomes long accordingly. The longer shift distance P2 increases the shift amount of the positions of the laser beams L having entered the hologram element 4 with time, which produces a larger number of patterns of laser beams released from the hologram element 4. Accordingly, the speckle patterns on the laser beams released from the hologram element 4 can be more effectively removed by increasing the shift distance P1.

While the structure including the three laser beam sources 2 has been discussed, the number of the laser beam sources 2 is not limited to three.

While laser beams enter the entrance end surface 4a of the hologram element 4 in the vertical direction, other appropriate design capable of illuminating the target illumination area S can be employed.

Modified Example of First Embodiment

While the reflection plate 3 is shifted in the X axis direction by parallel displacement by the function of the shift mechanism 15 according to the first embodiment shown in FIG. 1, a light source device 20 which reciprocates the reflection plate in the Y axis direction can be used. A modified example which uses the light source device 20 is now explained with reference to FIG. 3.

Figure 3:
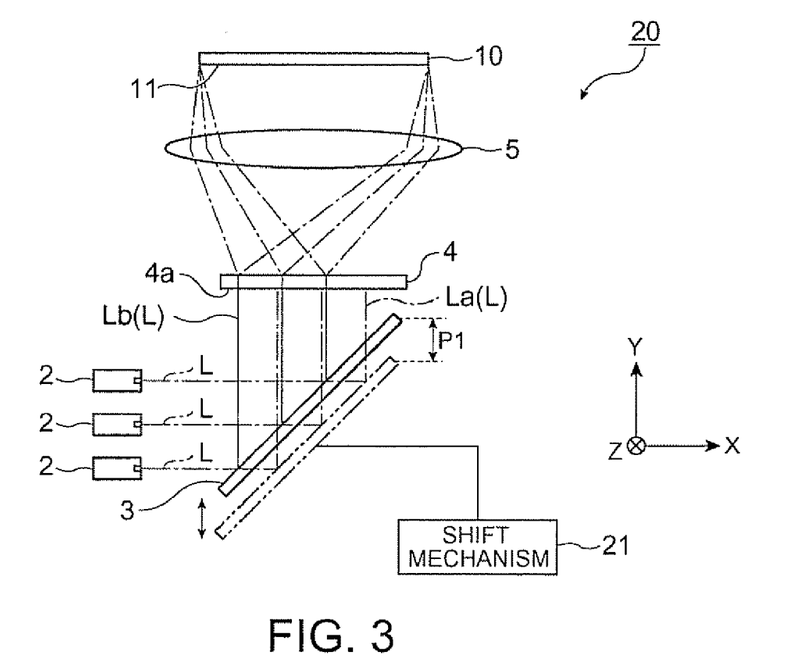
FIG. 3 is a plan view of a light source device according to a modified example of the first embodiment of the invention.

A shift mechanism 21 is a mechanism which shifts the reflection plate 3 for the shift distance P1 in the Y axis direction from a condition indicated by an alternate long and short dash line to a condition indicated by a solid line in FIG. 3. Thus, each center axis of the laser beams L reflected by the reflection plate 3 shifts from the laser beams La (alternate long and short dash line) to the laser beam Lb (solid line) by parallel displacement.

The light source device 20 having this structure can reduce speckle patterns on the laser beams released from the hologram element 4 similarly to the light source device 1 in the first embodiment by shifting the reflection plate 3 for the distance P1 in the Y axis direction.

Figure 4:
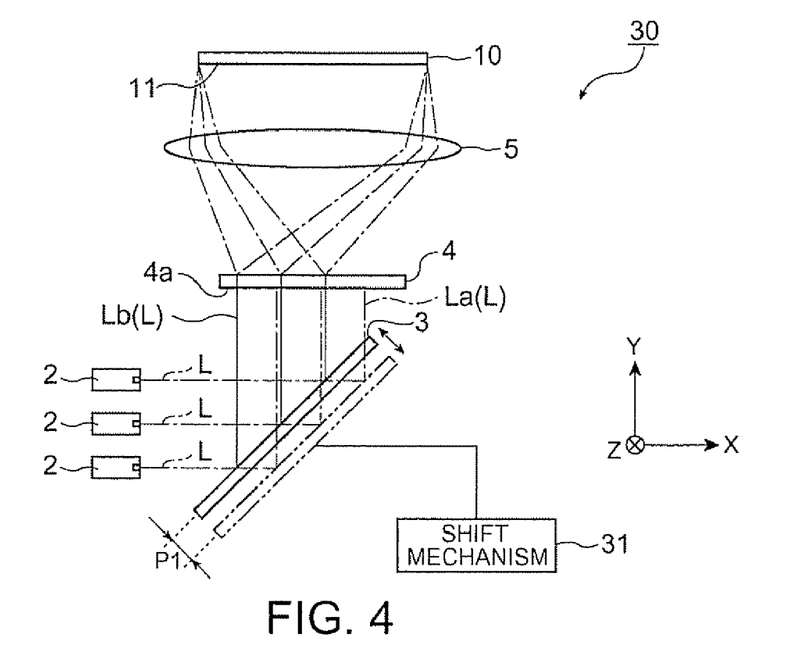
FIG. 4 is a plan view of a light source device according to another modified example of the first embodiment of the invention.

The shift direction of the reflection plate 3 is not limited to the Y axis direction. As illustrated in FIG. 4, a shift mechanism 31 of a light source device 30 is a mechanism which reciprocates the reflection plate 3 by parallel displacement in the direction inclined at 45 degrees to the X axis and the Y axis from a condition indicated by an alternate long and short dash line to a condition indicated by a solid line. In this structure, advantages similar to those in the first embodiment can be provided.

In this embodiment, the shift direction of the reflection plate 3 is not limited to the X axis direction, the Y axis direction, and the direction inclined at 45 degrees to the X axis and the Y axis, but may be any direction as long as the reflection plate 3 changes its position. At the shift of the reflection plate 3, it is preferable that the reflection plate 3 is moved such that the laser beams L can reach the entrance end surface 4a of the hologram element 4 in the vertical direction. In this case, speckle patterns on the laser beam released from the hologram element 4 can be reduced without decrease in light utilization efficiency.

Second Embodiment

A second embodiment according to the invention is now described with reference to FIGS. 5A and 5B through 8. In the following embodiments, similar reference numbers are given to parts similar to those of the light source device 1 in the first embodiment, and the same explanation is not repeated.

A light source device 40 in this embodiment is different from the light source device 1 in the first embodiment in that a shift mechanism 41 shifts the reflection plate 3 such that the reflection plate 3 achieves substantially rotational movement. Other structures are similar to those in the first embodiment.

Figure 5A:
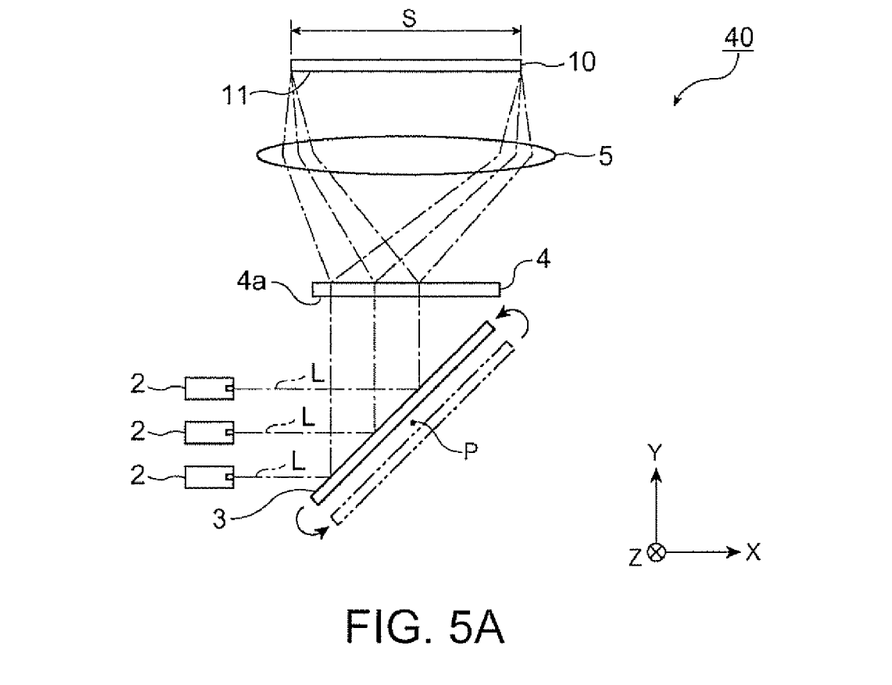
FIGS. 5A and 5B illustrate a light source device according to a second embodiment of the invention.
Figure 5B:
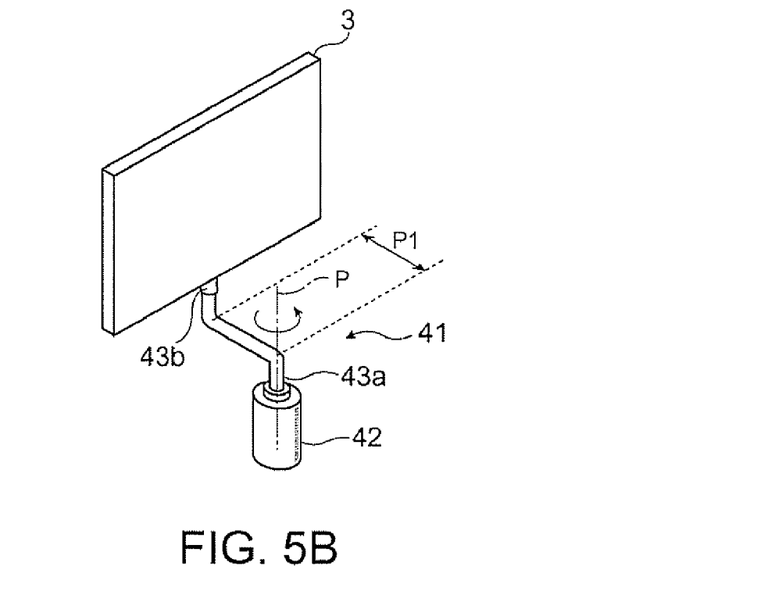
Figure 6A:
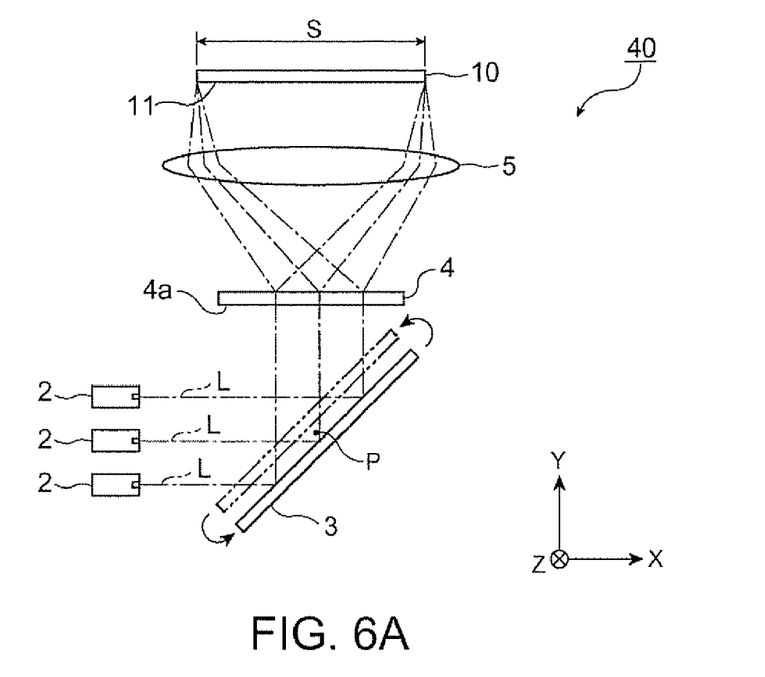
FIGS. 6A and 6B illustrate the light source device according to the second embodiment of the invention.
Figure 6B:
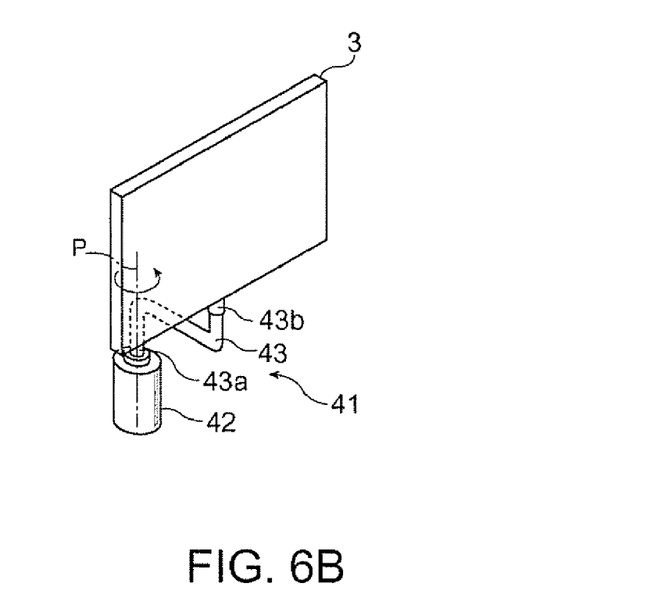

As illustrated in FIGS. 5B and 6B, the shift mechanism (shift unit) 41 has a support member 42 and a connection member 43. The support member 42 corresponds to a rotation axis P of the reflection plate 3, and rotates the connection member 43 around the rotation axis P. An end 43a of the connection member 43 is supported by the support member 42, and the other end 43b is connected with the reflection plate 3.

The connection member 43 rotates the reflection plate 3 around the rotation axis P from a condition shown in FIG. 5A to a condition shown in FIG. 6A while maintaining the angle formed between the reflection plate 3 and the entrance end surface 4a of the hologram element 4 at a fixed angle of 45 degrees and while defining a circular arc having a diameter P1 shown in FIG. 5B.

Thus, laser beams reflected by the reflection plate 3 enter the entrance end surface 4a of the hologram element 4 in the vertical direction at all times due to the fixed angle formed between the reflection plate 3 and the hologram element 4.

A method for illuminating the target illumination area S of the light receiving surface 11 on the illumination target 10 by using the light source device 40 having the structure according to this embodiment is now described.

The hologram element 4 performs substantially rotational movement around the rotation axis P by the function of the shift mechanism 41. With the rotation of the reflection plate 3, the laser beams L reflected by the reflection plate 3 changes their entering positions on the entrance end surface 4a at the time of entrance into the hologram element 4. Since the entering positions of the laser beams L entering the hologram element 4 continuously change without stop, the laser beams released from the hologram element 4 obtain different reproduction patterns in accordance with the positional changes. By superimposing these plural reproduction patterns, speckle patterns on the laser beams released from the hologram element 4 can be removed.

The light source device 40 according to this embodiment offer advantages similar to the light source device 1 provided in the first embodiment. Since the light source device 40 has no dead point (point at which movement stops for an instant) due to the substantially circular rotation of the reflection plate 3 by the function of the shift mechanism 41, no instant for generating speckle patterns on the light emitted from the hologram element 4 exists. Thus, the light source device 40 can apply equalized illumination light to the target illumination area S without lowering light utilization efficiency while securely reducing speckle patterns on the light.

The structure of the shift mechanism 41 is not limited to the structure discussed above, but may be any type as long as it can continuously shift the reflection plate 3.

Modified Example 1 of Second Embodiment

While the reflection plate 3 is continuously shifted by the substantial rotation of the reflection plate 3 in the second embodiment shown in FIGS. 5A and 5B and FIGS. 6A and 6B, a plurality of reflection plates (optical path converting units) 51a and 51b may be provided and continuously shifted. This modified example is now described with reference to FIG. 7.

Figure 7:
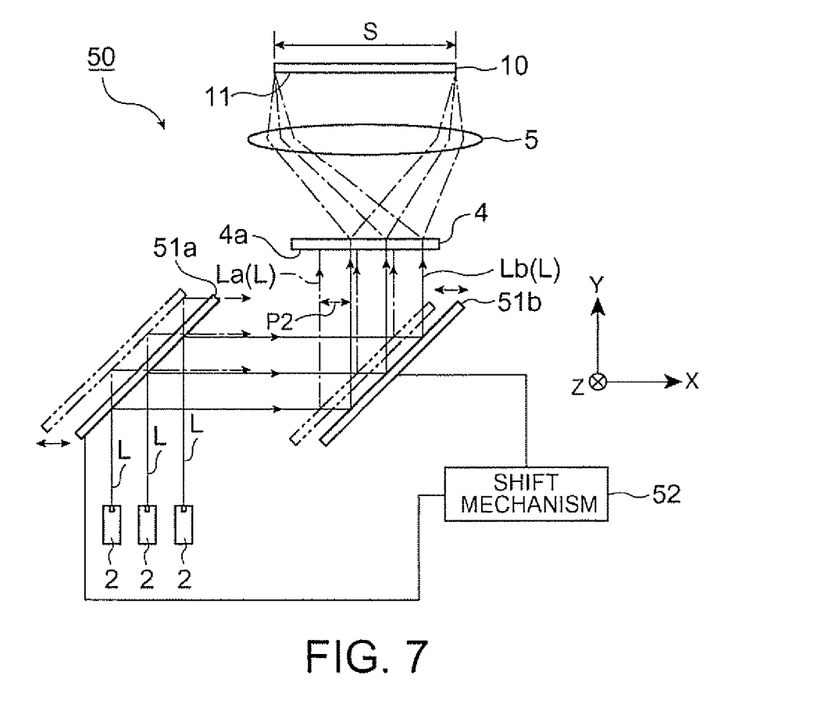
FIG. 7 is a plan view of a light source device according to a modified example of the second embodiment of the invention.

As illustrated in FIG. 7, the reflection plate 51a is disposed such that the laser beams L emitted from the plural laser beam sources 2 enter the reflection plate 51a at 45 degrees. Thus, the laser beams L reflected by the reflection plate 51a travel in the X axis direction. The reflection plate 51b is disposed such that the laser beams L reflected by the reflection plate 51a enter the reflection plate 51b at 45 degrees. Thus, the reflection plate 51b reflects the entering laser beams L toward the hologram element 4 in the Y axis direction.

A shift mechanism 52 is attached to the reflection plates 51a and 51b. The shift mechanism 52 has solenoids (not shown) provided for shifting each of the reflection plates 51a and 51b, and a controller (not shown) for controlling the respective solenoids. Under the control of the shift mechanism 52 over the shifts of the reflection plates 51a and 51b, at all times at least either the reflection plate 51a or the reflection plate 51b is shifted such that no break is produced in the continuation of movement in the X axis direction.

More specifically, the shift mechanism 52 shifts the reflection plate 51b at the time when the reflection plate 51a reaches the returning point during reciprocating movement, and shifts the reflection plate 51a at the time when the reflection plate 51b reaches the returning point during reciprocating movement. Thus, at all times at least either the reflection plate 51a or the reflection plate 51b is shifted such that no break is produced in the continuation of movement.

According to the light source device 50 in this modified example having the two reflection plates 51a and 51b, at all times at least either the reflection plate 51a or the reflection plate 51b is reciprocated such that no break is produced in the continuation of movement. In this case, dead point (point at which the optical path converting unit stops) is not produced. In the modified example, therefore, generation of dead point is prevented not by substantially circular movement of the reflection plate 3 which requires a driving system such as a motor, but by the reciprocating movements of the reflection plates 51a and 51b. Thus, control over the reflection plates 51a and 51b is facilitated.

The number of the reflection plates 51a and 51b is not limited to two. The shift directions of the reflection plates 51a and 51b are not limited to the X axis direction, but may be the Y axis direction or other directions as in the above example.

Modified Example 2 of Second Embodiment

While the reflection plate 3 is continuously shifted by the substantial rotation of the reflection plate 3 in the second embodiment shown in FIGS. 5A and 5B and FIGS. 6A and 6B, a light source device 60 having reflection plates 61a, 61b and 61c provided for each of the laser beam sources 2. This modified example is now described with reference to FIG. 8.

Figure 8:
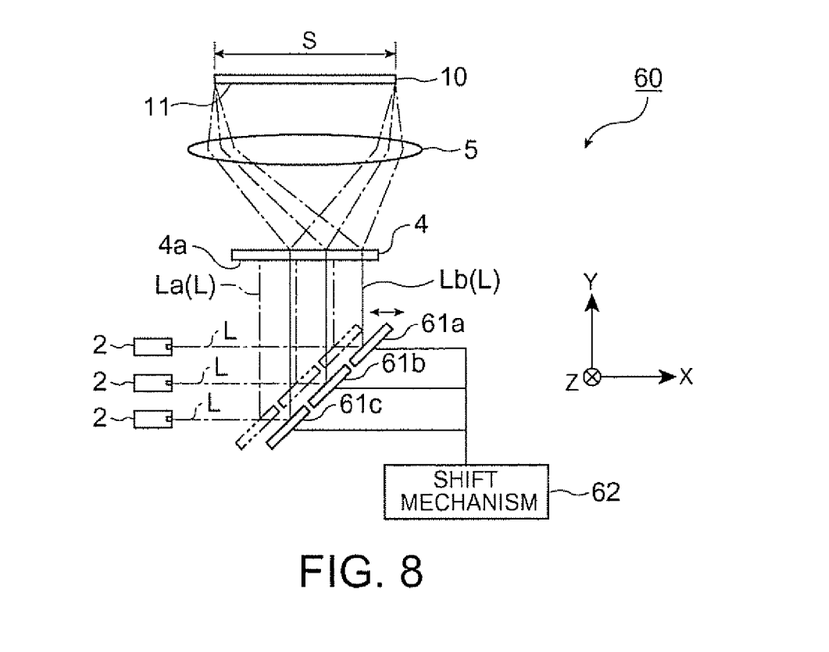
FIG. 8 is a plan view of a light source device according to another modified example of the second embodiment of the invention.

According to the light source device 60 illustrated in FIG. 8, each of the laser beams L emitted from the three laser beam sources 2 enters the corresponding reflection plate 61a, 61b or 61c.

A shift mechanism 62 is attached to the reflection plates 61a, 61b and 61c. The shift mechanism 62 has solenoids (not shown) provided for shifting the respective reflection plates 61a, 61b and 61c, and a controller (not shown) for controlling the respective solenoids. Under the control of the shift mechanism 62 over the shifts of the reflection plates 61a, 61b and 61c, at all times at least one of the reflection plates 61a, 61b and 61c is shifted such that no break is produced in the continuation of movement in the X axis direction.

More specifically, the shift mechanism 62 shifts at least either the reflection plate 61b or 61c at the time when the reflection plate 61a reaches the returning point during reciprocating movement, and similarly shifts the remaining reflection plate at the time when the reflection plate 61b or 61c reaches the returning point during reciprocating movement. Thus, at all times at least one of the reflection plates 61a, 61b and 61c is shifted such that no break is produced in the continuation of movement.

According to the light source device 60 in this modified example having the three reflection plates 61a, 61b and 61c, at all times at least any of the reflection plate 61a, the reflection plate 61b, or the reflection plate 61c is reciprocated such that no break is produced in the continuation of movement. In this case, dead point (point at which the optical path converting unit stops) is not produced. In the modified example, therefore, generation of dead point is prevented by the reciprocating movements of the reflection plates 61a, 61b and 61c similarly to the modified example 1. Thus, control over the reflection plates 61a, 61b and 61c is facilitated.

Since the reflection plates 61a, 61b and 61c are separately controlled, random (irregular) shift can be easily achieved. Thus, the entering position of light entering the hologram element 4 can be randomly varied. Accordingly, generation of speckle patterns on the light released from the hologram element 4 can be more securely prevented.

While the reflection plates 61a, 61b and 61c are provided for the laser beam sources 2 with one-to-one correspondence in this modified example, the reflection plates may be provided by other arrangements as long as they can convert the optical path of light emitted from at least one of the laser beam sources 2. Thus, the number of the reflection plates 3 is not limited to three but may be two. More specifically, such a structure having a first reflection plate into which the laser beams L emitted from the two laser beam sources 2 enter and a second reflection plate into which the laser beam L emitted from the remaining laser beam source 2 enters may be employed.

The shift directions of the reflection plates 61a, 61b and 61c are not limited to the X axis direction, but may be the Y axis direction or other directions as in the above example.

Third Embodiment

A third embodiment according to the invention is now described with reference to FIG. 9.

A light source device 70 in this embodiment is different from the light source device 1 in the first embodiment in that a prism 71 is used as a unit for converting the optical path of the laser beams L emitted from the laser beam sources 2. Other parts are similar to those in the first embodiment.

Figure 9:
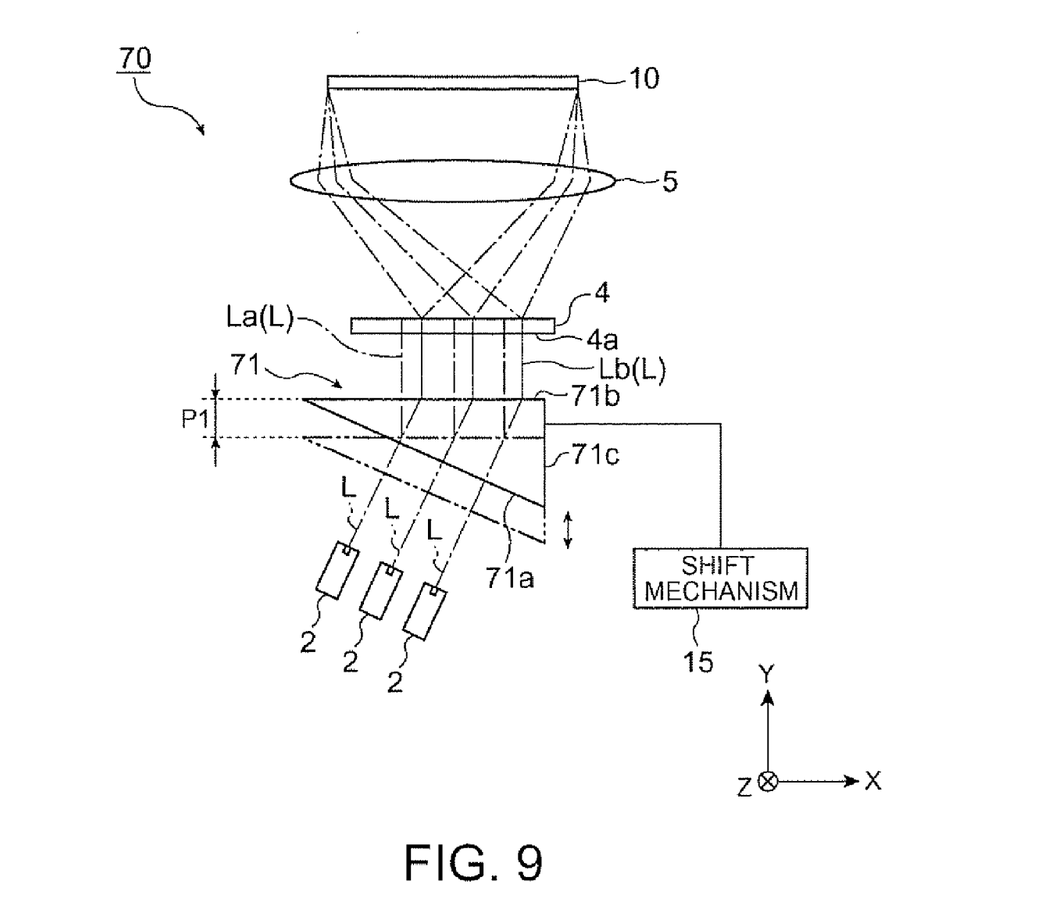
FIG. 9 is a plan view of a light source device according to a third embodiment of the invention.

As illustrated in FIG. 9, the prism 71 has a right-angled triangular cross section, and contains a surface 71a having a slope, a surface 71b having a long side, and a surface 71c having a short side. The prism 71 is disposed such that the surface 71b is opposed to the entrance end surface 4a of the hologram element 4. The laser beam sources 2 are disposed such that the laser beams L emitted therefrom enter the surface 71a in the vertical direction. Thus, the prism 71 refracts the laser beams L emitted from the laser beam sources 2 and entering through the surface 71a such that the laser beams L released from the surface 71b can travel toward the entrance end surface 4a of the hologram element 4.

The shift mechanism (shift unit) 15 for moving the prism 71 is attached to the prism 71. The shift mechanism 15 is constituted by a miniaturized solenoid, for example.

The shift mechanism 15 shifts the prism 71 for the distance P1 in the Y axis direction such that the prism 71 can reciprocate by parallel displacement from a condition indicated by an alternate long and short dash line to a condition indicated by a solid line in FIG. 9. Thus, the center axis of each laser beam L reflected by the prism 71 shifts from the laser beam La (alternate long and short dash line) to the laser beam Lb (solid line) by parallel displacement.

According to the light source device 70 in this embodiment, a plurality of reproduction patterns overlap with one another by the shift of the prism 71 for the distance P1 in the Y axis direction similarly to the first embodiment. Thus, speckle patterns on laser beam released from the hologram element 4 can be removed.

Since the surfaces 71a, 71b and 71c are designed in accordance with the positions of the laser beam sources 2 and the hologram element 4, the degree of freedom in positioning the laser beam sources 2 and the hologram element 4 increases.

When anti-reflection films are provided on the surfaces 71a and 71b of the prism 71, loss of light amount only comes from transmissivity of the prism material. In this case, the laser beams L emitted from the laser beam sources 2 can enter the hologram element 4 without any loss of light amount. Thus, illumination light having high brightness can be applied to the target illumination area S.

It is possible to use the prism in place of the reflection plates 3, 51a, 51b, 51c, 61a, 61b, and 61c in the second embodiment and the modified examples 1 and 2. It is also possible to use the prism as a part of the reflection plates in the modified examples 1 and 2 of the second embodiment.

Fourth Embodiment

Figure 10:
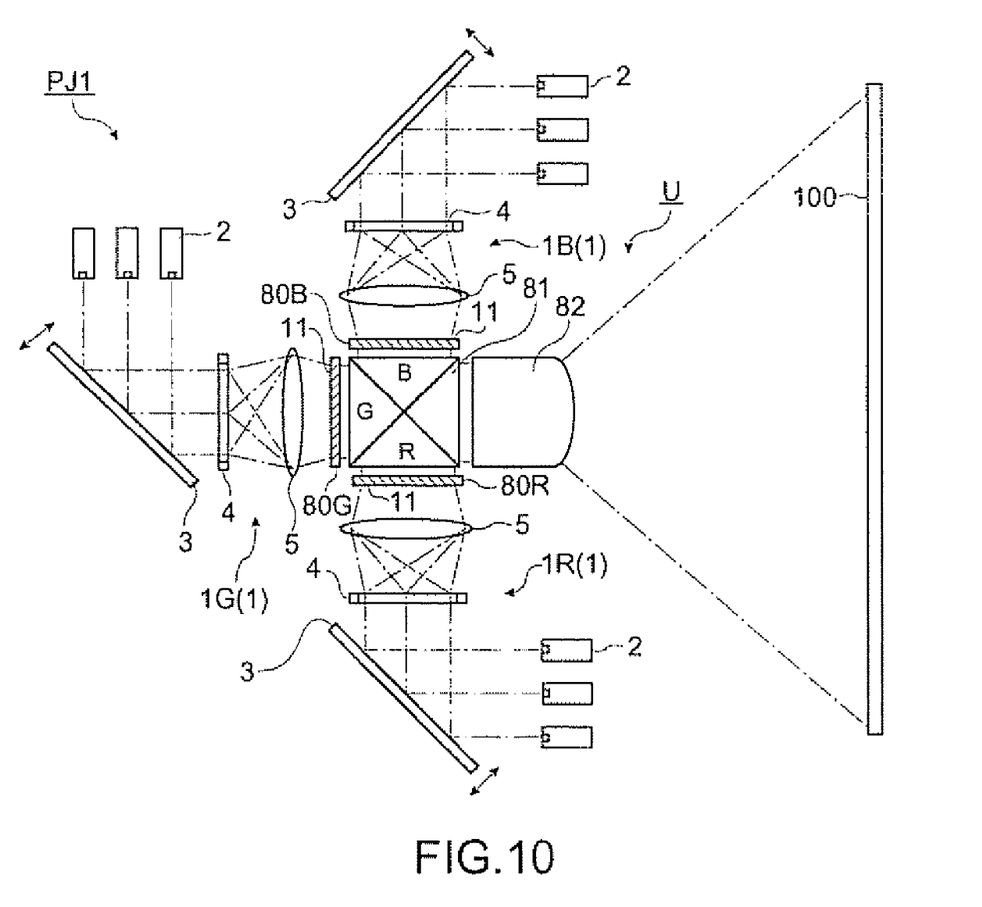
FIG. 10 is a plan view of a projector according to a fourth embodiment of the invention.

A fourth embodiment is now described. In this embodiment, a projector including the light source device 1 used in the above embodiments is discussed.

FIG. 10 illustrates a general structure of the projector including the light source devices 1 (1R, 1G and 1B) described in the first embodiment. In this embodiment, a projection type projector PJ1 which projects color light containing image information produced by spatial light modulation devices onto a screen via a projection system is discussed as an example of the projector.

As illustrated in FIG. 10, the projection type projector PJ1 includes a projection unit U for projecting light containing image information on a screen 100 (display surface). An image is formed on the screen 100 by using light projected on the screen 100 from the projection unit U. The screen 100 used in the projection type projector PJ1 in this embodiment is a reflection type screen, and light containing image information is projected on the screen 100 from the front side of the screen 100.

The projection unit U includes: the first light source device 1R for supplying first basic color light (red light) to the light receiving surface 11; the second light source device 1G for supplying second basic color light (green light) to the light receiving surface 11; the third light source device 1B for supplying third basic color light (blue light) to the light receiving surface 11; a first spatial light modulation device (light modulation device) 80R having the light receiving surface 11 to be illuminated by the first light source device 1R and modulating received light according to image information; a second spatial light modulation device (light modulation device) 80G having the light receiving surface 11 to be illuminated by the second light source device 1G and modulating received light according to image information; a third spatial light modulation device (light modulation device) 80B having the light receiving surface 11 to be illuminated by the third light source device 1B and modulating received light according to image information; a dichroic prism (color combining unit) 81 for combining the respective basic color lights modulated by the spatial light modulation devices 80R, 80G and 80B; and a projection system (projection device) 82 for projecting the light combined by the dichroic prism 81 on the screen 100. Each of the spatial light modulation devices 80R, 80G and 80B contains a liquid crystal device. In the following description, each of the spatial light modulation devices is referred to as "light valve".

The reflection plate 3 provided on each of the light source devices 1R, 1G and 1B is controlled by a shift mechanism (not shown). The reflection plate 3 is controlled such that the entering positions of the laser beams emitted from the laser beam sources 2 are shifted on the hologram element 4.

The control of the reflection plate 3 by the shift mechanism is preferably performed such that at all times at least one of the reflection plates 3 of the light source devices 1R, 1G and 1B is shifted. In this structure, at all times one of the reflection plates 3 is shifted such that no break is produced in the continuation of movement, and thus the three reflection plates 3 do not stop at the same time. Accordingly, generation of speckle patterns can be more securely prevented.

Each of the light valves includes an entrance side polarizer, a panel having a pair of glass substrates between which liquid crystals are sealed, and an exit side polarizer. Pixel electrodes and orientation films are provided on the glass substrates. The light valve constituting the spatial light modulation device is so designed as to transmit only light having predetermined oscillation direction, and basic color light entering the light valve is modulated while passing through the light valve.

Each of the plural laser beam sources 2 of the first light source device 1R emits red (R) laser beam. The first light source device 1R illuminates the light receiving surface 11 of the first light valve 80R by red laser beam.

Each of the plural laser beam sources 2 of the second light source device 1G emits green (G) laser beam. The second light source device 1G illuminates the light receiving surface 11 of the second light valve 80G by green laser beam.

Each of the plural laser beam sources 2 of the third light source device 1B emits blue (B) laser beam. The third light source device 1B illuminates the light receiving surface 11 of the third light valve 80B by blue laser beam.

The respective basic color lights (modulated lights) modulated while passing through the light valves 80R, 80G and 80B are combined by the dichroic prism 81. The dichroic prism 81 is constituted by a dichroic prism, and the red light (R), green light (G) and blue light (B) are combined by the dichroic prism 81 into full-color combined light. The full-color combined light released from the dichroic prism 81 is supplied to the projection system 82. The projection system 82 projects the full-color combined light on the screen 100. The projection system 82 is a so-called enlarging system which enlarges the image on the entrance side and projects the enlarged image on the screen 100.

The projection unit U forms a full-color image on the screen 100 via the projection system 82 by projecting full-color combined light containing image information produced by the respective light valves 80R, 80G and 80B which receive lights from the light source devices 1R, 1G and 1B. The audience observes the image projected on the screen 100 from the projection unit U.

The respective light valves 80R, 80G and 80B of the projector PJ1 in this embodiment receive illumination light having high illuminance and equalized illuminance distribution and containing reduced speckle patterns from the light source devices 1R, 1B and 1G having high illumination efficiency. The projector PJ1 in this embodiment, which has the light valves 80R, 80G and 80B receiving only lights having angles corresponding to the angles designed for the hologram elements 4 and the refractive lenses 5, displays more preferable images having high contrast than that in the structure having diffusing plates for reducing generation of speckle patterns. Thus, the projector PJ1 can display high-contrast and preferable images.

Fifth Embodiment

Figure 11:
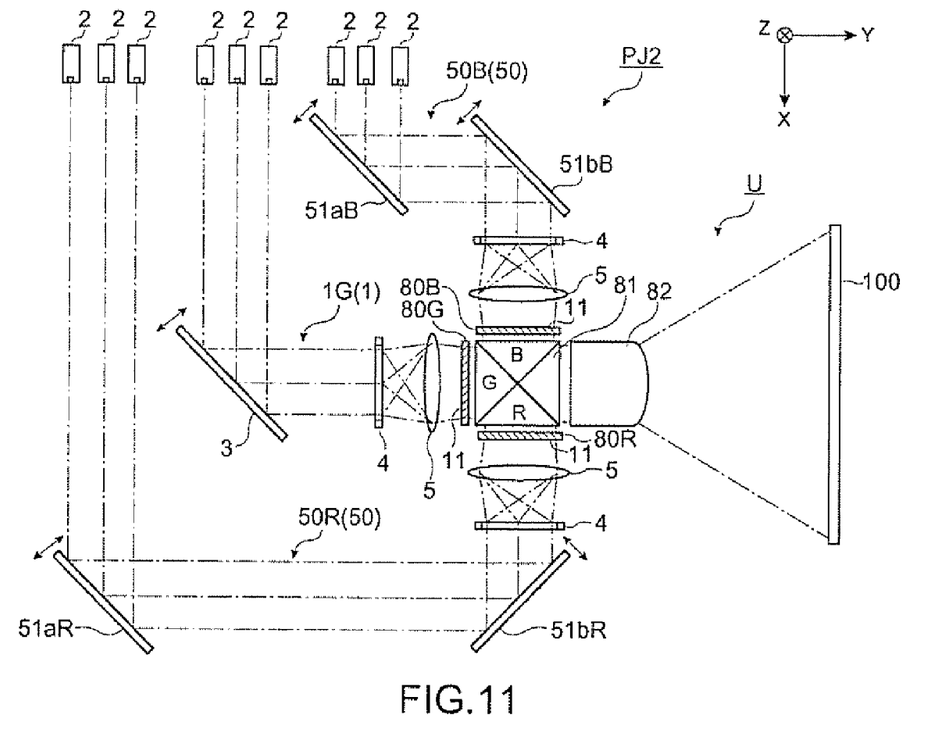
FIG. 11 is a plan view of a projector according to a fifth embodiment of the invention.

A fifth embodiment is now described. In this embodiment, a projector including the light source device 1 and the light source devices 50 described in the above embodiments is discussed.

FIG. 11 illustrates a general structure of the projector which includes the light source device 1 (1G) described in the first embodiment as a green light source device, and the light source devices 50 (50R, 50B) described in the modified example 1 of the second embodiment as red and blue light source devices. In this embodiment, a projection type projector PJ2 which projects color light containing image information produced by spatial light modulation devices on a screen via a projection system is discussed as an example of the projector.

The respective laser beam sources 2 of the light source devices 50R, 1G and 50B are disposed close to one another such that laser beams emitted from all the laser beam sources 2 travel in the X axis direction.

The blue light source device 50B has reflection plates 51aB and 51bB, and at all times at least one of these reflection plates 51aB and 51bB is shifted such that no break is produced in the continuation of movement.

Similarly, the red light source device 50R has reflection plates 51aR and 51bR, and at all times at least one of these reflection plates 51aR and 51bR is shifted such that no break is produced in the continuation of movement.

The green light source device 1G has the reflection plate 3 similar to that of the light source device in the fourth embodiment, and the reflection plate 3 achieves reciprocating movement.

The structure of the projection unit U is similar to that of the fourth embodiment.

Similarly to the fourth embodiment, the projector PJ2 in this embodiment applies illumination light having reduced speckle patterns and equalized illuminance distribution to the respective light valves 80R, 80G and 80B. Thus, the projector PJ2 can display high-contrast preferable images.

Moreover, the projector PJ2 includes the blue light source device 80B having the two reflection plates 51aB and 51bB, and the red light source device 50R having the two reflection plates 51aR and 51bR. Accordingly, the laser beam sources 2 of the respective light source devices 50R, 1G and 50B can be disposed close to one another, and thus can be collectively cooled by one cooling device.

Since the plural reflection plates are provided, the projector PJ2 can increase the degree of freedom in disposing the laser beam sources 2 and the hologram elements 4 while reducing speckle patterns.

While the front projection type projector which projects light containing image information on the screen 100 from the front side of the screen 100 has been discussed refereeing to FIGS. 10 and 11, the light source devices according to the respective embodiments can be incorporated in a so-called rear projector including the projection unit U, the screen 100 and a housing, in which the projection unit U disposed on the back side of the screen 100 projects light containing image information on the transmission type screen 100 from the back side of the screen 100.

According to the respective embodiments described above, the transmission type liquid crystal devices (light valves) have been used as the spatial light modulation devices. However, reflection type liquid crystal devices, or reflection type light modulation devices (mirror modulators) such as DMD (digital micromirror device) may be used.

According to the respective embodiments described above, the projectors PJ1 and PJ2 include the first, second and third light source devices 1R, 1G, 1B, 50R, 1G and 50B each of which has the laser beam sources 2 capable of emitting respective basic color lights (R, G and B). However, such a structure which includes only one light source device having an array of red laser beam source emitting red light (R), green laser beam source emitting green light (G), and blue laser beam source emitting blue light (B) may be employed. In this case, the laser beam emitting operation is performed by the laser beam sources for emitting the respective basic color lights by time division method. According to this structure, full-color images can be displayed on the screen 100 by using one light source device and one light valve by controlling the operation of the light valve in synchronization with laser beam emitting operations performed by the respective laser beam sources.

While the projectors according to the above embodiments illuminate the spatial light modulation devices by using the light source device 1 and displays images on the screen 100 by the lights having passed through the spatial light modulation devices, the projectors are not required to have spatial light modulation device. For example, the light source device 1 described in the above embodiments may be included in a so-called slide projector which illuminates a surface of a slide (positive film) containing image information by the light source device 1 and projects light containing the image information on a screen.

It is possible to use the light source devices described in the above embodiments as light source device included in a laser processing machine.

The technical scope of the invention is not limited to the embodiments described herein, and it is thus intended that various modifications may be made without departing from the scope and spirit of the invention.

While the cross dichroic prism has been used as the color light combining unit, the color light combining unit may be a component which combines color lights by dichroic mirrors disposed in a cross shape, or a component which combines color lights by dichroic mirrors disposed in parallel.

While the hologram element has been used as the superimposing illumination element, the superimposing illumination element may be a fly-eye lens, a rod integrator, or other element which can superimpose entering lights.

The entire disclosure of Japanese Patent Application NO. 2007-097195, filed Apr. 3, 2007 is expressly incorporated by reference herein.

What is claimed is:

1. A light source device which produces illumination light for illuminating a target illumination area on a predetermined light receiving surface, comprising:
   a light source which emits light;
   a superimposing illumination element which superimposes the light emitted from the light source and produces an illumination light for illuminating the target illumination area;
   a plurality of optical path converting units including a first optical path converting unit and a second optical path converting unit disposed on an optical path between the light source and the superimposing illumination element to convert the optical path of the light emitted from the light source and to supply the light having the converted optical path to the superimposing illumination element; and
   a shift unit which shifts the plurality of optical path converting units such that the center axis of light released from the plurality of optical path converting units is moved by parallel displacement, wherein:
   the first optical path converting unit is a reflection member which reflects the light emitted from the light source toward the second optical path converting unit;
   the second optical path converting unit is a reflection member which reflects a light reflected by the first optical path converting unit toward the superimposing illumination element;
   the shift unit continuously reciprocates the first optical path converting unit and the second optical path converting unit;
   the shift unit always shifts at least one of the plurality of optical path converting units; and
   the shift unit shifts the first optical path converting unit at a time when the second optical path converting unit reaches a returning point during reciprocating movement.

2. The light source device according to claim 1, wherein the optical path converting unit is a prism which refracts the light emitted from the light source toward the superimposing illumination element.

3. A projector, comprising:
   the light source according to claim 1;
   a light modulation device which modulates the light emitted from the light source according to an image signal; and
   a projection device which projects an image formed by the light modulation device.

4. A light source device which produces illumination light for illuminating a target illumination area on a predetermined light receiving surface, comprising:
   a plurality of light sources including a first light source and a second light source;
   a superimposing illumination element which superimposes a light emitted from the first light source and a light emitted from the second light source and produces an illumination light for illuminating the target illumination area;
   a plurality of optical path converting units including a first optical path converting unit and a second optical path converting unit; and
   a shift unit which shifts the plurality of optical path converting units, wherein:
   the first optical path converting unit is a reflection member which is disposed on an optical path between the first light source and the superimposing illumination element to convert the optical path of the light emitted from the first light source and to supply the light having the converted optical path to the superimposing illumination element;

the second optical path converting unit is a reflection member which is disposed on an optical path between the second light source and the superimposing illumination element to convert the optical path of the light emitted from the second light source and to supply the light having the converted optical path to the superimposing illumination element;

the shift unit shifts the first optical path converting unit such that the center axis of light released from the first optical path converting unit is moved by parallel displacement;

the shift unit shifts the second optical path converting unit such that the center axis of light released from the second optical path converting unit is moved by parallel displacement;

the shift unit continuously reciprocates the first optical path converting unit and the second optical path converting unit;

the shift unit always shifts at least one of the plurality of optical path converting units; and the shift unit shifts the first optical path converting unit at the time when the second optical path converting unit reaches a returning point during reciprocating movement.

5. A light source device which produces illumination light for illuminating a target illumination area on a predetermined light receiving surface, comprising:

a light source which emits light;

a superimposing illumination element which superimposes the light emitted from the light source and applies the light to the target illumination area;

an optical path converting unit disposed on an optical path between the light source and the superimposing illumination element to convert the optical path of the light emitted from the light source and supply the light having the converted optical path to the superimposing illumination element; and a shift unit which shifts the optical path converting unit, wherein the shift unit revolves the optical path converting unit around an axis perpendicular to the optical path such that the optical path converting unit revolves around an axis while maintaining an angle at a predetermined angle with the superimposing illumination element.

6. The light source device according to claim 5, wherein the shift unit includes a support member and an S-shaped connection member having a first end and a second end, the first end of the connection member is connected to the support member and the second end of the connection member is connected to the optical path converting unit.

7. The light source device according to claim 4, wherein the plurality of light sources further includes a third light source; and the first optical path converting unit further reflects light emitted from the third light source toward the superimposing illumination element.

* * * * *